May 31, 1932.   R. H. KEAN   1,860,676
LIQUID PURIFICATION
Filed Oct. 25, 1928   2 Sheets-Sheet 2

Inventor:
Robert H. Kean,
By Cromwell, Greist & Warden
Attys.

Patented May 31, 1932

1,860,676

UNITED STATES PATENT OFFICE

ROBERT H. KEAN, OF CHICAGO, ILLINOIS, ASSIGNOR TO GENERAL ZEOLITE COMPANY, OF CHICAGO, ILLINOIS, A CORPORATION OF ILLINOIS

LIQUID PURIFICATION

Application filed October 25, 1928. Serial No. 314,959.

Processes for the electro-osmotic treatment of liquids are usually characterized by the separation of the liquid under treatment from immediate contact with the electrodes by means of diaphragms and other bodies of liquids. Ordinarily the space between any pair of electrodes is divided into three parts by means of two diaphragms. The central portion of this space, between the two diaphragms, contains the liquid undergoing treatment while the portions between each electrode and the adjacent diaphragm contain the electrode wash liquids. The liquids to be treated and the electrode wash liquids are supplied to these spaces and after having undergone treatment or after having performed the desired amount of washing, they are removed. When water is being treated or purified, the raw water is not only supplied to the central space, but also utilized as wash water.

In a form of apparatus frequently employed, there are a number of cells, through which the liquid being treated flows in series while the electrode wash liquids are supplied to, and removed from, each cell separately. The bodies of wash liquid are maintained apart from bodies of liquid undergoing treatment or purification, and in them collect certain of the products of the electro-chemical reactions taking place at the electrodes, which cause the anodic wash liquors to become acidic and the cathodic wash liquids to become alkaline. It is for the purpose of removing these products from the system that the wash liquors are applied and maintained separate from the liquid being treated.

An object of this invention is to provide an improved apparatus of higher efficiency by means of which a greater degree of purification of the liquid being treated will be obtained with a smaller consumption of electrical energy.

Another object of this invention is to effect simplification and economy in the construction of apparatus for the electro-osmotic treatment of liquids.

A further object is to provide electro-osmotic apparatus with an improved system of washing the electrodes.

Other objects will appear during the course of the following description.

Several embodiments of this invention, to which it is by no means restricted, are shown on the accompanying sketches.

When electrode wash liquors are used, which themselves contain any electrolytes, the ions thus introduced in the wash liquors will migrate toward the appropriate electrodes just as do the ions of the electrolyte in the liquid undergoing purification or treatment. Not only will the anions in the anodic wash liquors migrate towards the anode, but the cations will migrate toward the cathode. This latter migration involves a passage of these cations through the anodic diaphragm into the body of liquid being treated or purified, and thence through the cathodic diaphragm into the cathodic wash liquor, and so to the cathode. The corresponding migration of anions from the cathodic wash liquor to the anode involves a similar passage of the anions through both diaphragms and the body of liquid being treated or purified.

The discharge at the electrodes of ions introduced into the system in the wash liquors does not by itself effect any desirable or useful purification of the liquid undergoing treatment in the central compartment, and from this point of view the electrical energy involved in this discharge is wasted. Furthermore, the migration through the liquid being treated of anions from the cathode wash liquors, and of cations from the anode wash liquors is also very undesirable, because in the event that the liquid being treated is removed from the system before the migration of these ions is completed, they will remain in the liquid and so contaminate it.

This migration is especially objectionable when these ions exist in the electrode wash liquors of any cell in appreciably greater concentrations than in the body of liquid being treated in that same cell. Such a condition may exist in an electro-osmotic purification of water in which water partially purified earlier in the process is fed to a cell, to which raw water is fed as wash water.

The migrations of hydrogen ions from the anodic wash liquors, and of hydroxyl ions from the cathodic wash liquors are usually less objectionable than the corresponding migrations of other cations and anions for the reason that they tend to combine to form water. It is therefore apparent that it would be very desirable to provide an electro-osmotic treatment in which the amount of electrode wash liquid is materially decreased or in which the composition of the electrode wash liquid is made substantially the same as the composition of the liquid being treated or purified or in which the tendency of ions in the electrode wash liquors to contaminate the liquid being treated or purified and to consume undesirable amounts of electric power is substantially eliminated.

When the liquid level in the central compartment of any cell is appreciably higher than the liquid levels in the electrode compartments of that cell there will be a seepage or flow of liquid from the central compartment through the diaphragms into the electrode compartments. The magnitude of the seepage will depend upon the difference in level, the permeability of the diaphragms, the temperature, and other factors. The flow into the cathodic compartments may be enhanced by the electro-endosmotic flow induced within the cell. This seepage or flow of liquid from the central compartment into the electrode compartments may be utilized to flush the electrode compartments, that is, be used as electrode wash liquid to remove from the system the undesirable products of the electrode reactions.

The reduction of the level of the liquids in the electrode compartments to obtain this difference in level between liquid in them and in the central compartment may cause an undesirable reduction in the active wetted area of the electrodes. This may be overcome by placing the electrodes sufficiently close to the diaphragms so that a film of liquid may be maintained by capillary forces between the electrodes and the diaphragms as shown upon Figures 1 and 2, or by providing suitable closures or retention means on the active face of the electrode so as to retain a body of liquid between the active face of the electrode and the diaphragm, as shown upon Figures 3 and 4, or by other means, in which event the wetted area of the electrode corresponds more nearly to the liquid level in the central compartment than to the liquid levels in the electrode compartments.

Figures 1, 2, 3:
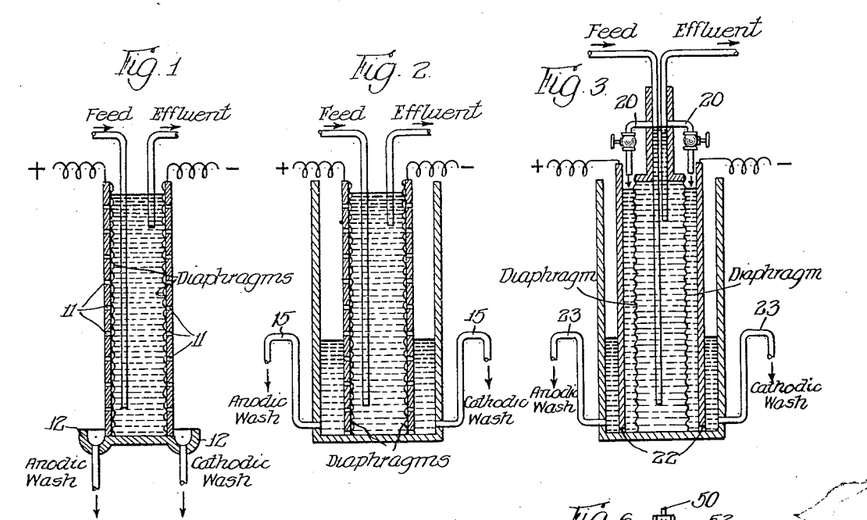
Figures 1 to 3 represent side sectional views of single electro-osmotic cells.

The close arrangement of the diaphragms close to the respective electrodes, as shown in Figures 1 and 2, has further advantages than that of maintaining the maximum active wetted electrode area. The speed of ionic migration depends upon the voltage gradient under which the ions move, and the removal of ions from the liquid in the central compartment of the cell is the result desired. The voltage gradient in the central compartment should be as great as conditions will permit, and the voltage drop across this compartment the greatest possible fraction of the total voltage impressed upon the cell. From this point of view the voltage drops across the electrode compartments may be considered as losses of available potential. By placing the electrodes very close to the diaphragms, the path of ionic travel in the electrode compartments is shortened to a minimum and the voltage drops across these compartments are correspondingly reduced. In the preferred process, the voltage drop across the body of liquid being treated or purified should be a major part of the total voltage impressed upon the cell.

In one embodiment of this invention, diagrammatically shown on Figure 1 of the drawings, a cell, or cells, without electrode compartments are used. In these cells, the electrodes are held sufficiently close to the diaphragms that the active faces of the electrodes are wetted by films of liquid held between the electrodes and the diaphragms by capillary forces, independent of the fact that the electrodes are not actually immersed in liquid. The products of the electro chemical reactions which tend to collect around the electrodes are flushed away by the liquid seeping or flowing through the diaphragms. Small channels may be provided upon the active faces of the electrodes to facilitate the flow of liquid as necessary, or the electrodes may be pierced, or made of screen, or have other provision for the escape of liquid from their active faces. In the embodiment of the invention shown, the perforations 11 are provided in the electrodes for this purpose. The electrode wash liquid flowing away from the active face of the electrode may be conducted away from the cell by the channels 12.

In another embodiment of this invention diagrammatically shown upon Figure 2 of the drawings, a cell, or cells, divided into three compartments may be utilized. The wash and liquid being treated are caused to flow through said compartments. The electrodes may be immersed in the electrode wash liquid. A control of the difference in levels from one side of each diaphragm to the other side may be used to influence the amount of seepage or flow through the diaphragm into the electrode compartments. Although this seepage may constitute a minor portion of the total electrode wash liquid, it should preferably constitute a major portion. The seepage may be supplemented by otherwise introducing treated water from the central compartment into the electrode compartments, and/or by similarly introducing into the electrode compartments raw or treated water from some other source. In the embodiment of the invention shown in Figure 1, each electrode is placed so close to the diaphragm that a film of liquid is maintained between the electrode and the diaphragm by capillary forces. This placing of the electrode makes necessary some provision for facilitating the flow of wash liquid away from the active face of the electrode; which is obtained by corrugating the electrode, by channelling or grooving the face of the electrode, or by piercing the electrode. This last-mentioned expedient is utilized in the embodiment of the invention shown in Figure 2. In this latter embodiment, the levels of liquid in the electrode compartments are controlled by the overflows 15.

Figures 4, 5:
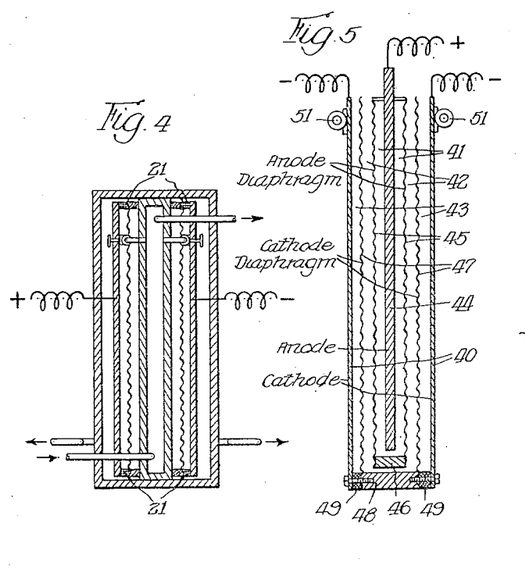
Figure 4 represents a cross sectional view of the cell shown in Figure 3.
Figure 5 represents a side sectional view and Fig. 6 a cross sectional view of a tank cell.

In still another embodiment of this invention, diagrammatically shown upon Figures 3 and 4 of the drawings, the electrode wash liquor is made up in whole or part of liquid being treated or purified which is conducted into the electrode compartments by gravity flow due to maintenance of a greater head in the purified water compartment than in the electrode compartments or by other means, as for example by pumping the liquid being treated or purified in each cell into its electrode compartments. In this embodiment the liquid level in the central compartment of any cell may be caused to stand higher than top of the active surface of the electrodes, or even higher than the top of the diaphragm. The liquid being treated may be caused to overflow the tops of the diaphragm into the electrode compartment when the liquid level in the central compartment is higher than the diaphragm or if the liquid level is not higher than the diaphragm, openings may be provided in the diaphragm adjacent to the liquid level in the central compartment so as to permit a flow of electrode wash liquid from the central compartment across the active face of the electrode.

In the particular embodiment of the invention shown in Figures 3 and 4 of the drawings, Figure 3 being a side sectional view and Figure 4 being a cross sectional view, the level of the liquid being treated or purified is maintained at a higher level than the top of the electrodes and the diaphragms. The liquid from the central compartment is caused to overflow through the conduits 20 from the central compartment to the electrode compartment. A layer of overflowing liquid is maintained on the face of the electrode by means of the side closures 21 (see Figure 4). This layer of liquid flows downwardly across the active face of the electrode and finally flows away from such face of the electrode through restricted passages 22 at the bottom of the electrode. These liquid passages are made of such a size that the overflowing wash liquid will be maintained upon the electrode face a suitable length of time. The level of the liquid in the electrode compartments and the rate of flow of liquid downward over the active face of the electrode are controlled by the position of the overflow pipe 23 and the size of the openings 22.

Figure 6:
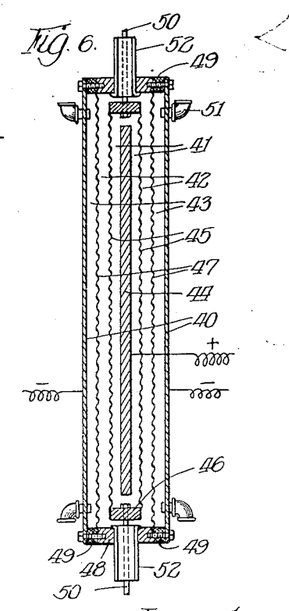

In these embodiments of the invention, the electrodes, in addition to their function as conductors of electricity, may also be caused to serve as structural elements of the apparatus, contributing to its strength and rigidity, and helping to support the hydrostatic pressure of the liquid contained in the different compartments therein. For example, in apparatus of the "tank cell" type where each cell is constructed in the form of a tank and placed apart from other cells, the electrodes may be caused to serve as portions of the walls of the tank as shown in Figures 5 and 6. In apparatus of the "filter press" type, the necessity for water-tight electrode compartments may be eliminated as shown in Figure 7.

In the tank cell construction shown upon Figures 5 and 6, the side walls of the cell are formed by the cathodes 40. The cell shown upon these figures is provided with five compartments, a central anode compartment 41, two intermediate compartments 42 for the water being purified, and two outside cathode compartments 43. The anode 44 is contained in the central anode compartment 41. The walls of the anode compartment are formed by the diaphragms 45, which diaphragms are attached to the frame 46 of the compartment. The outside walls of the water compartments are formed by the diaphragms 47 which are attached to the frame 48 of the cell. The cathodes 40 are attached to the cell frame. The spacers 49 regulate the width of the cathode compartments. Wash liquid may be removed from, and, if desirable, fed into the anode compartment by the connections 50 and into the cathode compartments by the connections 51. The liquid being purified is fed into and removed from the intermediate compartments 42 by the connections 52.

Figure 7:
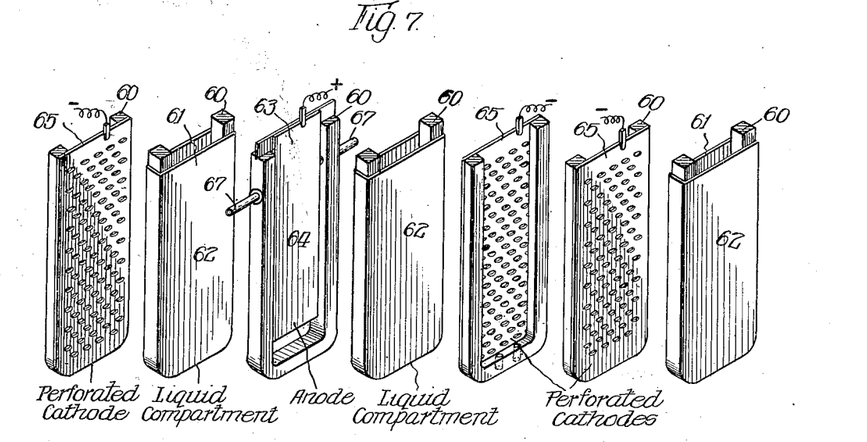
Figure 7 represents the elements of a compound or filter press construction showing the manner in which such elements are combined.

In the compound or filter press construction shown in Figure 7 the U-frames 60 are all clamped together as in a filter press. The compartments 61 for the liquid to be treated are formed by stretching a diaphragm 62 around every second and third U-frame 60 alternatively, forming a series of five compartment cells. Each of these compound cells consists of a central anode compartment, two intermediate compartments for the liquid being treated, and two outside cathode compartments. In each compartment 63 formed by every fifth U-frame 60, is suspended an anode 64. Every fourth and fifth U-frame 60 form a cathode compartment. Attached to the sides of these U-frames which are closest to the diaphragms 62 of the liquid compartments 61, is a perforated or other suitably channelled (as shown upon Figures 8 to 14) cathode 65. The cathode compartments are provided with the channels 66 for the escape of cathode wash liquids. The anode wash liquid may be removed from, and in certain cases also fed into, the anode compartment 63 by the pipes 67. Suitable liquid supply connections (not shown) are also provided for the compartments 61. The same construction may also be applied to a compound construction composed of three compartment cells, in which the anode will be suitably channelled or otherwise drained and positioned closely adjacent to the diaphragm 62.

Figure 8:
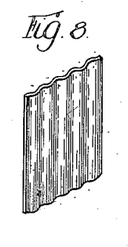
Figures 8 to 14 represent various electrode constructions.
Figure 9:
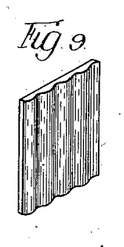
Figure 10:
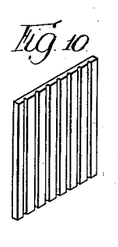
Figure 11:
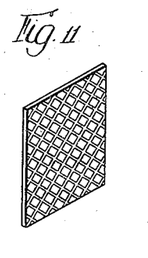
Figure 12:
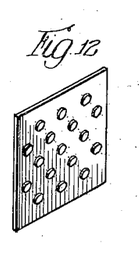
Figure 13:
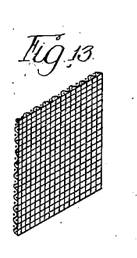
Figure 14:
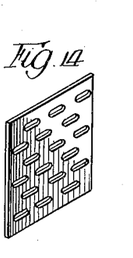

Figures 8 to 14 show a number of various constructions of electrodes to insure proper flow of wash liquid when the electrode is placed in close proximity to the diaphragm. In Figure 8 there is shown an electrode corrugated on both faces, in Figure 9 an electrode corrugated on its active face only, in Figure 10 an electrode grooved vertically on its active face, in Figure 11 an electrode grooved in two diagonal directions on its active face, in Figure 12 an electrode provided with studs or small projections on its active face, in Figure 13 a screen electrode and in Figure 14 a pierced or perforated electrode similar to those shown in Figures 1 and 2. By utilization of electrodes of this character, not only is a satisfactory flow of electrode wash liquid across the active face of the electrode obtained, but the direction of such flow may also be controlled. For example, in Figures 8, 9 and 10, the flow is vertically across the active face of the electrode, in Figure 11 it is diagonally across the active face of the electrode, and in Figures 13 and 14 it is perpendicularly away from the active face of the electrode.

Comparisons of results which may be obtained in the treatment of water by the present process and by other electro-osmotic processes are given in the following tables:

*Table I*

| Apparatus | Flow liters per hour per 1.74 sq. ft. of anode area | Electrical power watts | Total dissolved solids—parts per million | | Efficiency factor. Watt hrs. per liter per 100 ppm removed from water |
|---|---|---|---|---|---|
| | | | Influent water | Effluent water | |
| Type IV | 9.5 | 14.9 | 143 | 114 | 5.4 |
| Type IV | 9.2 | 20.9 | 143 | 105 | 6.0 |
| Unsubmerged electrode | 9.5 | 18.7 | 150 | 45 | 1.8 |

*Table II*

| Type IV | 9.5 | 14.9 | 143 | 114 | 5.4 |
|---|---|---|---|---|---|
| Type IV | 9.2 | 20.9 | 143 | 105 | 6.0 |
| Unsubmerged electrode | 23.2 | 6.0 | 152 | 113 | 0.65 |

"Type IV" apparatus is one of the compound or filter press type in which the wash liquid is supplied separately to each electrode compartment from an outside source. "Unsubmerged electrode" apparatus is an embodiment of this invention similar to that shown in Figure 1, in which a magnetite anode and a bronze cathode are held in close proximity to sail cloth diaphragms. The face of the anode is provided with small channels for the flow of wash liquid, and the cathode consists of a woven bronze wire screen, through the meshes of which the washing liquor can escape. The electrodes are unsubmerged, the supply of washing liquid being furnished entirely by seepage or flow through the sail cloth diaphragms. The liquid under treatment is Chicago city water with a solid content of 140 to 150 parts per million calculated as calcium carbonate. In the "Type IV" apparatus, the water being treated was passed through six five-compartment cells connected in series across 110 volts, while in the unsubmerged electrode apparatus, the water was passed through only one cell.

Table I shows that with equal power consumptions and rates of production of purified liquid, a high degree of purification may be effected by this invention. Thus the dissolved solids of Chicago water are reduced from 150 ppm to 45 ppm by the use of this invention in comparison to a reduction of from 143 to 110 (average) obtained by other electro-osmotic methods.

Table II shows a comparison of results obtained when Chicago water is purified to the same degree by the two methods. This invention permits the production of 23.2 liters per hour with a power consumption of 6.0 watts as compared with a production of approximately 9.5 liters per hour with a power consumption of 15 to 20 watts by either method.

The maintenance of a higher level in the compartment containing the liquid being treated or purified than in the compartments containing the electrodes, not only tends to cause a seepage of the liquid being treated or purified through the diaphragms into the electrode compartments, but it also tends to prevent or to insure against a possible seepage of the electrode wash liquor into the body of liquid being treated or purified. In the preferred embodiment of this invention, the level of the liquid being treated should be at least ¼ to ½ inch higher than the level of the electrode wash liquor. For example, in a laboratory apparatus of 8" depth, the highest liquid level may be an inch or more higher than the lowest liquid level while in a commercial apparatus with a depth of 40", the level of the liquid being treated or purified may be 38" in height, while the level of the electrode wash liquor may be 26" to 31" in height.

It will be noted in the preferred embodiment of the invention, when the electrode wash liquid will be composed for the major part of seepage or overflow of the liquid being treated, or purified, that the composition of the electrode wash liquid as applied to the electrode, will substantially be the same as, or will approximate, the composition of the liquid being purified or treated. This will greatly reduce the tendency of the electrode wash liquid to cause contamination of the liquid being purified or treated.

It will also be noted that the flow of electrode wash liquid from the compartment containing the liquid being treated or purified may be readily controlled by controlling the difference in level between the liquid being treated and the electrode wash liquid. It is frequently desirable to have a greater volume of liquid flowing through the anode compartment than through the cathode compartment and in such a case the difference between the level of the liquid being treated and the level in the anode compartment should be greater than the corresponding difference between the level of the liquid being treated and the level in the cathode compartment.

A similar result may also be obtained by providing an overflow into the anode compartment and not into the cathode compartment, or by utilizing a more permeable diaphragm between the liquid being treated and the anode than between the liquid being treated and the cathode, or by causing additional liquid from an outside source to flow through the anode compartment and not through the cathode compartment.

In the embodiments of the invention shown upon Figures 1 to 7 the electro-osmotic cells are divided into three or five compartments by means of the permeable diaphragms and the electrodes. In the three compartment cell the anode and cathode form the outside walls of the electrode compartments, while in the five compartment cells either the anodes or cathodes form the outside walls while the other electrode is suspended in the middle compartment. The inside partitioning walls between the electrode compartments and the compartments containing the liquid being purified or treated are formed of permeable diaphragms which preferably will admit of a desired seepage of liquid in the direction of lower liquid level. The outside walls, which preferably form the cathodes, are of metal such as iron or zinc, and may be placed in close proximity to the diaphragms so as to support the same and keep them from bulging outwardly in the embodiments shown in Figures 1, 2 and 7. The electrodes are placed so as to form a pocket or compartment between the electrode and the diaphragm down through which all liquid overflowing or seeping from the compartment containing the liquid being purified or treated will flow. The level of liquid in this pocket is maintained higher than the free level of liquid in contact with the electrode by means of capillarity or suitably restricted drainage or both. Such means are provided for admitting and removing the liquids to and from the various compartments so as to cause a slow passage of liquid through the treating compartment and across the face of the electrode.

In a preferred embodiment of the invention the diaphragms are of sail cloth, which may vary between No. 6 and No. 10 duck, the cathodes are of iron and the anodes are of magnetite. The cathodes, when forming a structural and supporting element of the cell, should be capable of withstanding a hydrostatic pressure greater than that due to one inch of water.

What is claimed is:

1. In an electro osmotic apparatus, a series of electro osmotic cells each comprising a treating compartment for the liquid being treated and anode and cathode compartments, anodes and cathodes in said anode and cathode compartments respectively, permeable diaphragms forming the partitions between the anode and cathode compartments and the treating compartment, means for causing passage of the liquid to be treated into the treating compartment, means for removing a major portion of such liquid from the treating compartments directly, and means for causing a passage of electrode wash liquor through the electrode compartments from the treating compartment comprising means for maintaining a higher level in the treating compartment than in the electrode compartments and permitting overflow of liquid from the treating compartment into the electrode compartments and against the active faces of the electrodes, and means for removing electrode wash liquid from the electrode compartments.

2. An electro osmotic apparatus comprising a compartment for the liquid being treated, means permitting passage of the liquid being treated through this compartment, permeable diaphragms forming the walls of said compartment, electrodes outside of said compartment, means for causing a major portion of the liquid being treated to flow out of said compartment without contacting with said electrodes, means for causing a minor portion of said liquid to flow out of said compartment into contact with said electrodes, said electrodes being positioned in contact with said permeable diaphragms and the adjacent faces of such electrodes being provided with depressions forming channels for flow of liquid.

3. In an electro osmotic apparatus, a series of electro osmotic cells comprising compartments for the liquid being purified and anode and cathode compartments, anodes and cathode in said anode and cathode compartments respectively, permeable diaphragms forming the partitions between the anode and cathode compartments and the compartment containing the liquid, means for removing a major portion of liquid being purified directly from the purifying compartment being purified, means for passing the liquid being purified into the compartment for such liquid and means for causing a passage of electrode wash liquor across the active face of the electrode from the compartment containing the liquid being treated comprising means for maintaining a higher level in the compartment for the liquid being purified than in the electrode compartment to cause a seepage of a minor portion of the liquid being purified into the electrode compartments and means for conducting electrode wash liquid from the electrode compartments.

4. An electro osmotic apparatus comprising a series of electro-osmetic cells each composed of a compartment for the liquid being purified and electrode compartments separated from said first mentioned compartment by permeable diaphragms, means for causing a passage of the liquid being purified through the compartment for such liquid, means for removing a major portion of liquid being purified directly from the purifying compartment and means for causing a minor portion of the liquid being purified to flow into the electrode compartment and against the face of the electrodes, said electrode being placed in sufficiently close proximity to the diaphragms so that a major portion of the space between the electrodes of different sign shall constitute the compartment containing the liquid being treated.

5. An electro osmotic apparatus comprising a compartment for the liquid being treated, means for passing liquid for treatment into this compartment, permeable diaphragms forming the walls of said compartment, electrodes outside of said compartment, means for causing a major portion of the liquid being treated to flow out of said compartment without contacting with said electrodes, means for causing a minor portion of said liquid to flow out of said compartment into contact with said electrodes, said electrodes being positioned sufficiently close to said diaphragms to cause retention of a film of water upon the adjacent faces by capillary action.

6. A electro osmotic apparatus comprising electrode compartments and treating compartments for the liquid being treated, permeable diaphragms forming side walls for said compartments, electrodes positioned in said electrode compartments, so arranged in respect to the diaphragms as to afford them lateral support and provide intervening passages for the electrode wash liquid, said treating compartments having inlets and outlets other than through said diaphragms, and means for conducting the liquid from said passages.

7. An electro osmotic apparatus comprising a compartment for the liquid being treated, means for passing liquid being treated into and out of said compartment, permeable diaphragms forming the walls of said compartment, and electrodes positioned sufficiently close to the outer sides of said diaphragms so that a film of liquid of appreciably higher level than the free surface of the liquid in said compartment will be maintained therebetween.

8. An electro osmotic apparatus having a treating compartment for the liquid being treated and anode and cathode compartments, anodes and cathodes in respective anode and cathode compartments permeable diaphragms forming the partitions between the anode and cathode treating compartments and the compartment, and means for causing a passage of electrode wash liquor into the electrode compartments from the treating compartment, same comprising means to maintain a substantially higher level in the treating compartment than in the electrode compartments and conduits for the liquid from the treating compartment to the electrode compartments.

9. An electro osmotic apparatus comprising a series of electro-osmotic cells each comprising a treating compartment having inlet and outlet for the liquid being treated and electrode compartments separated from said treating compartment by permeable diaphragms, said diaphragms and outlets being so proportioned as to permit only a minor portion of the liquid being purified to flow into the electrode compartments and against the face of the electrode, said electrodes forming structural elements of the cell and being so placed as to support the diaphragms.

10. In an electro osmotic apparatus, a treating compartment for the liquid being treated, electrode compartments on each side of and adjacent to said treating compartment, permeable diaphragms separating said compartments, electrodes forming the outer boundary walls of said electrode compartments and being adapted to support a head of water between them and the diaphragms, the treating compartment provided with inlet and outlet for the treated liquid, and means for draining off liquid from within the electrode compartments.

11. An electrode osmotic apparatus comprising a compartment for the liquid being treated, means for passing the liquid being treated into said compartment, permeable diaphragms forming the walls of said compartment, electrodes maintained in such proximity to the diaphragms that the active wetted area of the electrode approximates the level of the liquid on the side of the diaphragm opposite the electrode and means for removing a major portion of the liquid being treated directly from the treating compartment without contact with the electrodes.

12. An electro osmotic apparatus, a series of electro osmotic cells each comprising a treating compartment for the liquid being treated and anode and cathode compartments, anodes and cathodes in said anode and cathode compartments respectively, permeable diaphragms forming the partitions between the anode and cathode compartments and the treating compartment, and means for causing passage of electrode wash liquor through the electrode compartments from the treating compartment comprising means to maintain a higher level of liquid in the treating compartment than in the electrode compartments, the diaphragms being arranged to permit a flow of the liquid being treated into the electrode compartments and against the active faces of the electrodes and means for removing electrode wash liquid from the electrode compartments.

13. An electro osmotic apparatus comprising a series of electro osmotic cells each composed of a treating compartment for the liquid being treated and electrode compartments separated from said treating compartment by permeable diaphragms and means for causing a gravity flow of liquid from the treating compartment through and over the diaphragms into the electrode compartments and against the faces of the electrodes.

14. An electro osmotic apparatus comprising a compartment for the liquid being treated, means for passing liquid to be treated into this compartment, permeable diaphragms forming the walls of said compartment, electrodes outside of said compartment, means for passing a major portion of the liquid being treated out of said compartment without contacting with said electrodes, provision for passage of a minor portion of said liquid in contact with said electrodes, said electrodes being positioned closely adjacent to said permeable diaphragms and the adjacent faces of such electrodes being provided with elevations for guiding liquid thereon.

15. An electro osmotic apparatus comprising a series of electro-osmotic cells each composed of a treating compartment for the liquid being treated and electrode compartments separated from said treating compartment by permeable diaphragms, means for passing a major portion of the liquid being treated out of the treating compartment directly, said diaphragms permitting only a minor portion of the liquid being treated to flow into the electrode compartments and against the faces of the electrodes under the attraction of gravity, said electrodes being placed in sufficiently close proximity to the diaphragms to support the same and substantially to prevent the same from bulging.

16. In an electro osmotic apparatus, a treating compartment for the liquid being treated and anode and cathode compartments, anodes and cathodes in said anode and cathode compartments respectively, and means permitting passage of a minor portion of the liquid being treated into the electrode compartments from the treating compartment comprising permeable diaphragms separating said compartments, means for maintaining a higher level in the treating compartment than in the electrode compartments, said compartments associated to permit overflow of liquid from the treating compartment into the electrode compartments, and means for passing electrode wash liquid out of the electrode compartments.

17. An electro osmotic apparatus comprising a series of electro-osmotic cells, each comprising a treating compartment for the liquid being treated and electrode compartments separated therefrom by permeable diaphragms, means for removing a major portion of such liquid from the treating compartment directly and means for causing a gravity flow of a minor portion of the liquid being treated from the treating compartment into the electrode compartments, electrodes placed in the electrode compartments in sufficiently close proximity to the diaphragms so that substantially all of the space between the electrodes of each cell shall constitute its treating compartment.

In testimony whereof I have hereunto subscribed my name.

ROBERT H. KEAN.

CERTIFICATE OF CORRECTION.

Patent No. 1,860,676.  May 31, 1932.

ROBERT H. KEAN.

It is hereby certified that error appears in the printed specification of the above numbered patent requiring correction as follows: Page 4, line 127, after "power" insert the word of; page 6, line 24, claim 3, for "cathode" first occurrence read cathodes, and lines 28 to 31, strike out the comma and words ", means for removing a major portion of liquid from being purified directly from the purifying compartment" and insert the same to follow the word "liquid" in line 33; same page, line 59, claim 4, for "electrode" read electrodes, and line 110, claim 8, strike out the word "treating" and insert the same before "compartment" in line 111; page 7, line 16, claim 11, for "electrode" read electro; and that the said Letters Patent should be read with these corrections therein that the same may conform to the record of the case in the Patent Office.

Signed and sealed this 4th day of October, A. D. 1932.

M. J. Moore,
Acting Commissioner of Patents.

(Seal)

CERTIFICATE OF CORRECTION.

Patent No. 1,860,676.  May 31, 1932.

ROBERT H. KEAN.

It is hereby certified that error appears in the Certificate of Correction issued October 4, 1932, in the above numbered patent requiring correction as follows: Line 5, strike out the word "from" first occurrence; and that the said Certificate of Correction should be read with this correction therein that the same may conform to the record of the case in the Patent Office.

Signed and sealed this 22nd day of November, A. D. 1932.

(Seal)

M. J. Moore,
Acting Commissioner of Patents.